(12) United States Patent
Swinson et al.

(10) Patent No.: US 8,762,219 B2
(45) Date of Patent: Jun. 24, 2014

(54) SYSTEM, METHOD AND PROGRAM PRODUCT FOR PREDICTING BEST/WORST TIME TO BUY

(75) Inventors: Michael Swinson, Santa Monica, CA (US); Param Pash Kaur Dhillon, Sherman Oaks, CA (US); Xingchu Liu, Los Angeles, CA (US)

(73) Assignee: TrueCar, Inc., Santa Monica, CA (US)

( * ) Notice: Subject to any disclaimer, the term of this patent is extended or adjusted under 35 U.S.C. 154(b) by 318 days.

(21) Appl. No.: 13/232,444

(22) Filed: Sep. 14, 2011

(65) Prior Publication Data

US 2012/0066092 A1 Mar. 15, 2012

Related U.S. Application Data

(60) Provisional application No. 61/382,807, filed on Sep. 14, 2010.

(51) Int. Cl.
*G06Q 30/00* (2012.01)
*G06Q 30/02* (2012.01)
*G06Q 30/06* (2012.01)

(52) U.S. Cl.
CPC ................................. *G06Q 30/02* (2013.01); *G06Q 30/0613* (2013.01)
USPC .......................................... 705/26.1

(58) Field of Classification Search
USPC ................................................ 705/26.1–27.2
See application file for complete search history.

(56) References Cited

U.S. PATENT DOCUMENTS

2004/0199429 A1\* 10/2004 Kwoh .............................. 705/26
2010/0088148 A1\* 4/2010 Presswala et al. ............... 705/10

OTHER PUBLICATIONS

Gold, G., "On Those Car Rental Deals: Slow Down, Curves Ahead" (NY Times, May 24, 1974, p. 70).\*

\* cited by examiner

*Primary Examiner* — Ethan D Civan
(74) *Attorney, Agent, or Firm* — Sprinkle IP Law Group (57) ABSTRACT

In response to a user request for information on the best/worst days in an upcoming time period to buy a commodity, a vehicle data system may determine anticipated daily discounts applicable to the commodity. An example commodity may be a vehicle of a specific configuration. In one embodiment, characteristics of month, day of week, and day of month may be gathered and fed into a Best Day to Buy model to determine, for each day of the time period, a projected daily discount relative to a set price for the commodity. Additional input variables such as incentives and seasonal discounts may be included. From the computed daily discounts, the vehicle data system may determine the best day and/or the worst day to buy and report same to the user.

20 Claims, 4 Drawing Sheets

SYSTEM, METHOD AND PROGRAM PRODUCT FOR PREDICTING BEST/WORST TIME TO BUY

CROSS-REFERENCE TO RELATED APPLICATION

This application is a conversion of and claims priority from Provisional Application No. 61/382,807, filed Sep. 14, 2010, entitled "SYSTEM, METHOD AND PROGRAM PRODUCT FOR PREDICTING BEST/WORSE TIME TO BUY," which is fully incorporated herein by reference.

TECHNICAL FIELD

This disclosure relates generally to providing consumers with valuable information that would facilitate them in making purchase decisions. More particularly, embodiments disclosed herein relate to a system, method, and computer program product for predicting best/worst, time to buy a commodity such as a particular model of a vehicle.

BACKGROUND OF THE RELATED ART

Consumers are at a serious negotiation disadvantage when they do not have information relevant to a specifically desired product or do not understand such information. Exacerbating this problem is the fact that complex, negotiated transactions can be difficult for consumers to understand due to a variety of factors, including interdependence between local demand and availability of products or product features, the point-in-time in the product lifecycle at which a transaction occurs, and the interrelationships of various transactions to one another. For example, a seller may sacrifice margin on one aspect of one transaction and recoup that margin from another transaction with the same (or a different) customer. Furthermore, currently available data for complex transactions is single dimensional. To illustrate with a specific example, a recommended price (e.g., $20,000) for a particular product may not take into account how sensitive that price is (is $19,000 a good or had price?) relative to the same product sold by other sellers, to similar products for sale and/or sold by the same seller, to the same product sold in the past and/or different locations, etc. Recommended prices also become decreasingly accurate as the product, location, and availability of a particular product is defined, with greater specificity.

These circumstances can be seen in a variety of contexts. In particular, the automotive transaction process may entail complexity of this type. Specifically, the price a consumer pays may depend on the vehicle, the dealership, historical patterns, anticipated sales patterns, promotion programs, the customer's and dealer's emotions on a particular day, the time of the day, the day of the month, and the dynamics of the negotiation itself, and so on. Often times, neither the consumers nor the dealers can fully understand what a good or great price, is for a certain vehicle having a particular combination of make, model, trim combinations or packages, etc. Additionally, even though new vehicles are commodities, transparent pricing information resources for consumers simply do not exist. Some dealers attempt to optimize or maximize pricing from each individual customer through the negotiation process which inevitably occurs with customers in the setting of an automotive vehicle purchase.

There are therefore a number of unmet desires when it comes to obtaining, analyzing and presenting vehicle pricing data.

SUMMARY OF THE DISCLOSURE

Embodiments disclosed herein provide a system, method, and computer program product for predicting best/worst time to buy a commodity. In some embodiments, the commodity can be a type of vehicle or a particular model of a vehicle. For example, in one embodiment, the commodity can be a new car or truck.

In some embodiments, a report on the best/worst time to buy a commodity can be provided to consumers over a network. In one embodiment, the network can include the World Wide Web (Web). As an example, the report may be generated at a server computer and delivered over the network to a computing device, associated with an end user or it may be assembled at the computing device with information provided by the server computer. The report can be displayed to the end user via a Web browser application running on the computing device associated with the end user.

In some embodiments, the report may prepared by software running on one or more server machines based on input data obtained from a plurality of sources and input data generated at the one or more server machines. In some embodiments, some or all of the plurality of sources may reside external to the one or more server machines. In some embodiments, the software may be included in a computer program product comprising at least one non-transitory computer readable medium storing instructions translatable by the one or more server machines. In some embodiments, the computer program product is part of a vehicle data system. In some embodiments, the vehicle data system may comprise a Web based user interface through which the report is displayable.

In some embodiments, the report may contain, as of the day the report is generated, projections of discounts on purchasing a particular commodity over a time period. For example, a consumer may want to know, within the next 30 days (or some other time interval), which day the consumer may find the biggest, discount if they are to purchase a new car on that particular day (the best day to buy). In one embodiment, the report may also indicate a day associated with the least discount (the worse day to buy). In one embodiment, the report may include anticipated discounts relative to a set price for a given vehicle model. One example of a set price might be the manufacturer suggested retail price (MSRP) for the given vehicle model.

In one embodiment, a method for predicting best/worst time to buy a commodity may comprise gathering a set of characteristics of month, day of week, and day of month. Software running on one or more server computers may construct a predictive model and provide the set of characteristics as inputs to the predictive model. For each day of a certain time period, the software may derive, compute, or otherwise determine a projected daily discount relative to a set price for the commodity and identify the best day to buy the commodity based on projected daily discounts thus derived. The resulting information may be presented to a user over a network in the form of a report.

In one embodiment, additional inputs to the predictive model may also be provided. For example, one input may represent a set of variables, each for a major holiday. Another input may represent a set of variables, each for a minor holiday. Yet another input may represent a discount on the same day of last year. Further, values of different incentives may be provided as inputs. In one embodiment, each of these incentives can be determined utilizing an incentive model.

Software implementing embodiments disclosed herein may be implemented in suitable computer-executable instructions that may reside on a computer-readable storage medium. Within this disclosure, the term "computer-readable storage medium" refers to any non-transitory data storage medium that can be read by a processor. Examples of non-transitory computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

Embodiments disclosed herein can provide many advantages. For example, in some embodiments, the report may include one or more visual presentations such as a price curve, bar chart, histogram, etc. that reflect new car purchase discounts on a daily basis relative to a specific vehicle configuration. Such a visual presentation may provide clarity to a potential new car purchasing consumer and facilitate the consumer in making an informed decision.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The invention, and the various features and advantageous details thereof are explained more fully with reference to the non-limiting embodiments that are illustrated in the accompanying drawings and detailed in the following description. These embodiments may be better understood with reference to U.S. patent application Ser. No. 12/556,076, entitled "SYSTEM AND METHOD FOR AGGREGATION, ANALYSIS, PRESENTATION AND MONETIZATION OF PRICING DATA FOR VEHICLES AND OTHER COMMODITIES" by Taira et al., U.S. patent application. Ser. No. 12/556,109, entitled. "SYSTEM AND METHOD FOR CALCULATING AND DISPLAYING PRICE DISTRIBUTIONS BASED ON ANALYSIS OF TRANSACTIONS" by Taira et al., and U.S. patent application Ser. No. 12/556,137, entitled "SYSTEM AND METHOD FOR SALES GENERATION IN CONJUNCTION WITH A VEHICLE DATA SYSTEM" by Inghelbrecht et al., all of which were filed on Sep. 9, 2009 and are fully incorporated by reference herein. Descriptions of well-known starting materials, processing techniques, components and equipment are omitted so as not to unnecessarily obscure the invention in detail. It should be understood, however, that the detailed description and the specific examples, while indicating preferred embodiments of the invention, are given, by way of illustration only and not by way of limitation. Various substitutions, modifications, additions and/or rearrangements within the spirit and/or scope of the underlying inventive concept will become apparent to those skilled in the art from this disclosure. For example, though embodiments of the invention have been presented using the example commodity of vehicles it should be understood that other embodiments may be equally effectively applied to other commodities.

As discussed above, complex, negotiated transactions can be difficult for consumers to understand due to a variety of factors, especially in the context of vehicle purchases. In particular, the historical lack of transparency around vehicle pricing still exists in the automotive industry, resulting in cases where different consumers can go to the same dealership on the same day and pay substantially different prices for the exact same vehicle sold by the same salesperson.

To remedy this lack of availability of pricing information, a variety of solutions have been unsuccessfully attempted. For example, in the mid-1990s, companies such as Autobytel (www.autobytel.com) launched websites focused on enabling consumer's access to manufacturer's new car pricing information. Soon after, Kelley Blue Book (www.KBB.com) launched its own websites that enabled consumers to determine approximate "trade in values" and "retail values" of used cars.

In 1998, CarsDirect developed its own interpretation of what "consumers should pay" for a vehicle by launching its upfront pricing tools. CarsDirect's upfront price is a published figure for which a consumer could actually purchase a vehicle through CarsDirect's auto brokering service. This price subsequently became the consumer benchmark for negotiating with dealers in their area.

In 2000, Edmunds (www.edmunds.com) launched a pricing product called True Market Value (TMV), which is marked on their website as "calculating what others are paying for new and used vehicles, based on real sales data from your geographic area." Although Edmunds presents their data to their customer as accurate, the data may only represent what they believe a typical buyer is paying for a specific vehicle within a pre-determined region. Although not necessarily accurate, TMV has become the most widely recognized new car pricing "average" in the market place.

In 2005, Zag (Zag.com) launched an affinity auto buying program that enabled consumers to purchase upfront pricing from its network of nationwide dealer partners. These partner dealers are required to input low, "fleet" level pricing in Zag's pricing management system. These prices are displayed to the consumers and are measured against Kelley Blue Book's New Car Blue Book Value (which is similar to Edmunds' TMV). These prices are defined by Zag as "what people are really paying for a vehicle."

Problematically, current consumer vehicle pricing resources, including KBB.com, Edmunds.com and various blogs and research sites, allow for the configuration of a particular vehicle but only present a single recommended price for the vehicle, no matter the specified configuration. Due to a variety of circumstances (including the lack of transparency of how the recommended price was determined, whether and how any actual data was used to determine the recommended price or how such data was obtained), there is no indication of where the recommended price sits relative to prices others paid and whether the recommended price is a good price, a great price, etc. (either relative to other prices, or in an absolute sense). Additionally, many of the existing pricing sites are "lead generation" sites, meaning that they generate revenue by referring consumers to dealers without requiring dealers to commit to a specific price, inherently making these types of sites biased in favor of dealers when presenting pricing to consumers. Moreover, these pricing recommendation sites may not utilize actual sales transaction data, but instead may utilize estimates calculated manually based on aggregated or manipulated data.

Accordingly, a myriad number of problems exist with current approaches to pricing solutions for vehicles and other commodities. One such problem is that a consumer may not have any context with which to interpret a price obtained from a vehicle pricing resource and therefore, a consumer may have little idea what constitutes a good price, a great price, an average price, etc., nor will they know what the dealer's actual cost is for a desired vehicle. This confusion may be exacerbated given the number of variables which may have a bearing on that particular consumer's transaction, including the particular locale where the consumer intends to purchase the vehicle or the specific configuration of vehicle desired by the consumer. Consequently, the consumer may not be convinced that a price provided by a pricing site is particularly relevant to their situation or goals and may therefore only be able to use such a provided price as a baseline.

There are therefore a number of unmet desires when it comes to obtaining new or used vehicle pricing. These desires include the ability to use actual sales transaction data in the calculation of prices for particular vehicles and account for variations in the configuration of vehicles and the geography in which the vehicle will be purchased. Furthermore, it may be desired that such pricing data is analyzed and displayed in such a manner that a holistic view of pertinent sales transaction data can be presented to allow the distribution of pertinent sales data and the various ranges of prices to be easily ascertained and a determination, of a certain price levels easily made.

To meet those needs among others, attention is now directed to the aggregation, analysis, display and monetization of pricing data for commodities in general, and which may be particularly useful applied to vehicles. In particular, actual sales transaction data may be obtained from a variety of sources. This historical transaction data may be aggregated into data sets and the data sets processed to determine desired pricing data, where this determined pricing data may be associated with a particular configuration (e.g., make, model, power train, options, etc.) of a vehicle. An interface may be presented to a user where a user may provide relevant information such as attributes of a desired vehicle configuration, a geographic area, etc. The user can then be presented with a display pertinent to the provided information utilizing the aggregated data set or the associated determined pricing data where flue user can make a variety of determinations such as a mean price, dealer cost or factory invoice for a desired vehicle, pricing distributions, etc. based on the provided display. In one embodiment, this interface may be a website such that the user can go to the website to provide relevant information and the display corresponding to the provided information is presented to the user through the website.

Figure 1:
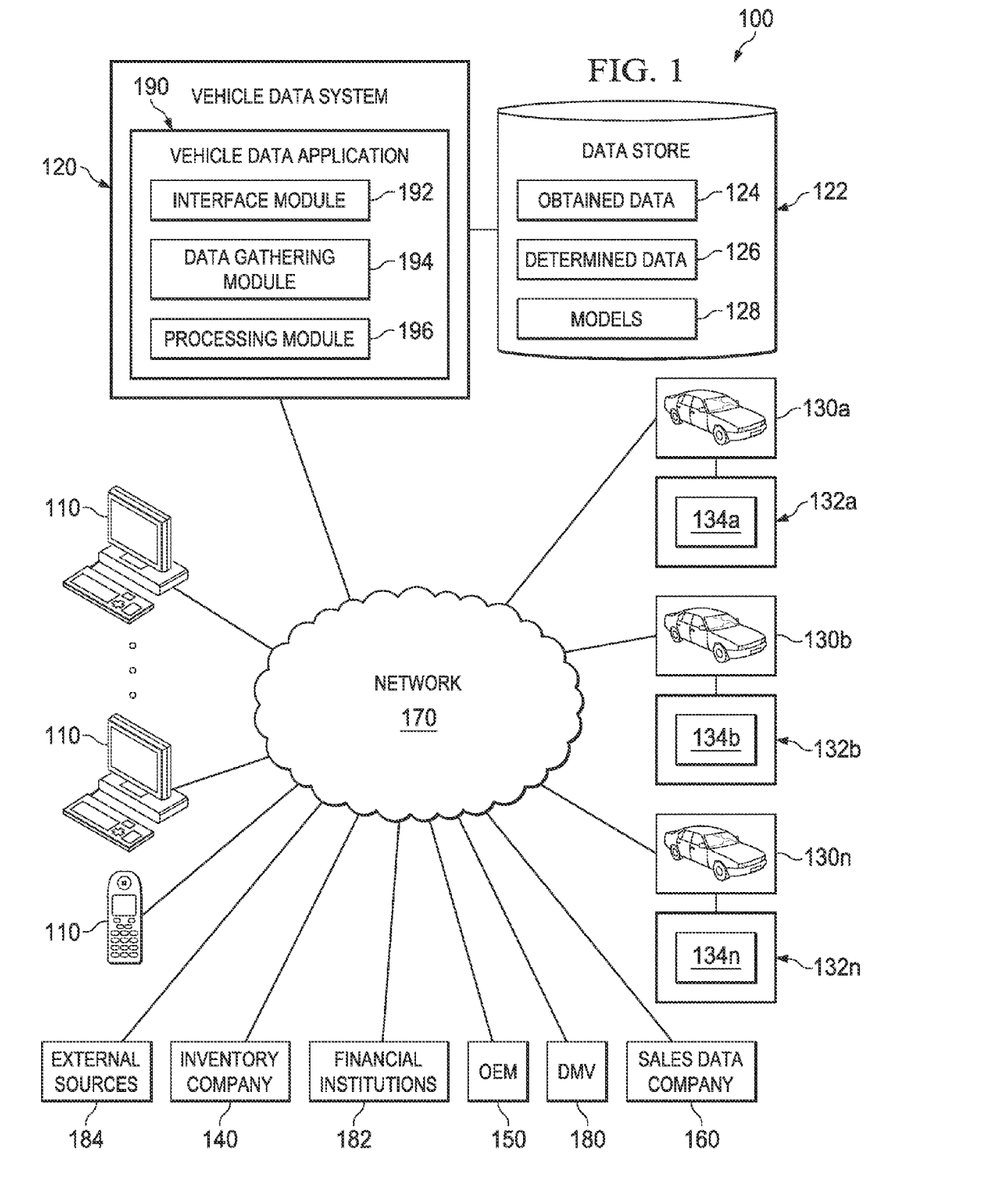
FIG. 1 depicts one embodiment of a topology including a vehicle data system.

Embodiments disclosed herein may be better understood with reference to FIG. 1 which depicts one embodiment of a topology which may be used to implement embodiments of the systems and methods of the invention. Topology 100 comprises a set of entities including vehicle data system 120 (also referred to herein as the TrueCar system) which is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, car dealers 130. Network 170 may include, for example, a wireless or wireline communication network such as the Internet or wide area network (WAN), publicly switched telephone network (PTSN) or any other type of electronic or non-electronic communication link such as mail, courier services, or the like.

Vehicle data system 120 may comprise one or more computer systems with central processing units executing instructions embodied on one or more computer readable media where the instructions are configured to perform at least some of the functionality associated with embodiments disclosed herein. These applications may include a vehicle data application 190 comprising one or more applications (instructions embodied on a computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments of the invention or determined during the implementation of those embodiments.

Vehicle data system 120 may provide a wide degree of functionality including utilizing one or more interfaces 192 configured to, for example, receive and respond to queries from users at computing devices 110; interface with inventory companies 140, manufacturers 150, sales data companies 160, financial institutions 170, DMVs 180 or dealers 130 to obtain data; or provide data obtained, or determined, by vehicle data system 120 to any of inventory companies 140, manufacturers 150, sales data companies 160, financial institutions 182, DMVs 130, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 130, external data sources 184 or dealers 130 and store such data in data store 122. This data may be then grouped, analyzed or otherwise processed by vehicle data system 120 to determine desired data 126 or models 128 which are also stored in data store 122. A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110. More specifically, in one embodiment interfaces 192 may visually present the selected data set to the user in a highly intuitive and useful manner.

In particular, in one embodiment, a visual interface may present at least a portion of the selected data set as a price curve, bar chart, histogram, etc. that reflects quantifiable prices or price ranges (e.g., "average," "good," "great," "overpriced" etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the user in understanding the presented data, the interface may also present data related to incentives which were utilized to determine the presented data and/or how such incentives were applied to determine presented data.

Turning to the various other entities in topology 100, dealer 130 may be a retail outlet for vehicles manufactured by one or more of OEMs 150. To track or otherwise manage sales, finance, parts, service, inventory and back office administration needs, dealers 130 may employ a dealer management system (DMS) 132. Since many DMS 132 are Active Server Pages (ASP) based, transaction data 134 may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" price (price with no negotiation) and may be deemed a "fair" price by vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by a dealer to pull data from a DMS 132 and format the data for use on website(s) and/or by other systems. Inventory management companies may manually upload inventory information (which may include photos, description, specifications, and so on) on behalf of the dealer. Listing aggregators may get their data by "scraping" or "spidering" websites that display inventory content and receiving direct feeds from listing websites (for example, Autotrader, FordVehicies.com, etc.).

DMVs 180 may collectively include any type of government entity to which a user provides data related to a vehicle. For example, when a user purchases a vehicle it must be registered with the state (for example, DMV, Secretary of State, etc) for tax and titling purposes. This data typically includes vehicle attributes (for example, model year, make, model, mileage, etc.) and sales transaction prices for tax purposes.

Financial institution 182 may be any entity such as a bank, savings and loan, credit union, etc. that provides any type of financial, services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies may aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various sources, online or otherwise, which may provide other types of desired data, for example, data regarding vehicles, pricing, demographics, economic conditions, markets, locale(s), consumers, etc.

It should be noted here that not all of the various entities depicted in topology 100 are necessary, or even desired, in certain embodiments of the invention, and that certain aspects of the functionality described with respect to the entities depicted in topology 100 may be combined into a single entity or eliminated altogether. Additionally, in some embodiments, other data sources not shown in topology 100 may be utilized. Topology 100 is therefore exemplary only and should in no way be taken as imposing any limitations on embodiments disclosed herein.

Before delving into the details of various embodiments of the invention, it may be helpful to give a general overview of an embodiment of the invention with respect to the above-described embodiment of a topology, again using the example commodity of vehicles. At certain intervals then, vehicle data system 120 may obtain by gathering (for example, using interface 192 to receive or request) data from one or more of inventory companies 140, manufacturers 150, sales data companies 160, financial, institutions 182, DMVs 180, external data sources 184 or dealers 130. This data may include sales or other historical transaction data for a variety of vehicle configurations, inventory data, registration data, finance data, vehicle data, etc. It should be noted that different types of data may be obtained at different time intervals, where the time interval utilized in any particular embodiment for a certain type of data may be based, at least in part, on how often that data is updated at the source, how often new data of that type is generated, an agreement between the source of the data and the providers of the vehicle data system 120, and/or a wide variety of other factors. Once such data is obtained and stored in data store 122, it may be analyzed and otherwise processed to yield data sets corresponding to particular vehicle configurations (which may include, for example, vehicle make, model, power train, options, etc.) and geographical areas (which may include, for example, national, regional, local, city, state, zip code, county, designated market area (DMA), and/or any other desired geographical area).

At some point then, a user at a computing device may access vehicle data system 120 using one or more interfaces 192 such as a set of web pages provided by vehicle data system 120. Using this interface 192, a user may specify a vehicle configuration by defining values for a certain set of vehicle attributes (for instance, make, model, trim, power train, options, etc.) and/or other relevant information, such as a geographical location or incentives offered in conjunction with a vehicle of the specified configuration. Information associated with the specified vehicle configuration may then be presented to the user through interface 192. Data corresponding to the specified vehicle configuration can be determined using a data set associated with the specified vehicle configuration, where the determined data may include data such as adjusted transaction prices, mean price, dealer cost, standard deviation or a set of quantifiable price points or ranges (e.g., "average," "good," "great," "overpriced," etc. prices).

In some embodiments, the user may wish to gain knowledge on the best/worst days in an upcoming time period to buy a vehicle of the specified configuration. In some embodiments, this knowledge may be prepared by vehicle data system 120 and presented to the user via interface 192. In one embodiment, the presentation may be in the form of a report. In one embodiment, the report may contain projections of daily discounts over the time period and may indicate the best and worst daily discounts. As an example, the report may contain projections of daily discounts for the next 30 days from the day the report is requested by the user.

Figure 2:
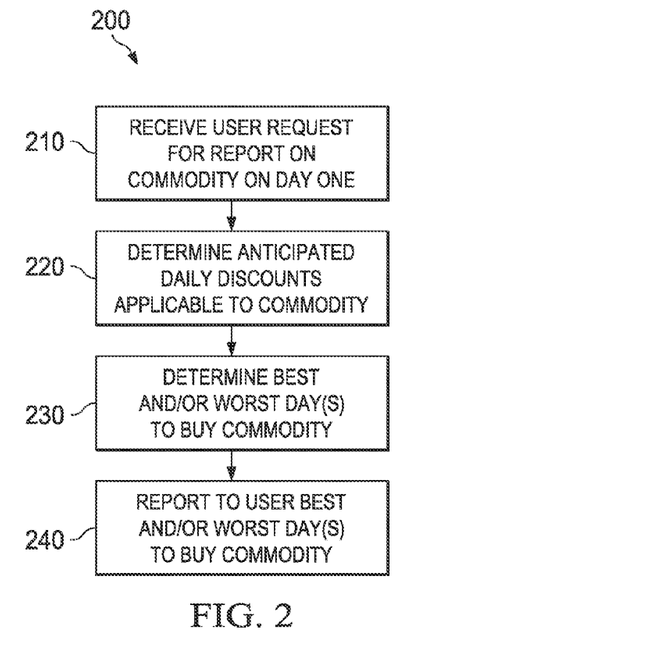
FIG. 2 depicts a flow diagram illustrating an example method for predicting best/worst time to buy a commodity such as a particular model of a vehicle.

FIG. 2 depicts a flow diagram illustrating example method 200 for predicting best/worst time to buy a commodity. Following the above example, in response to a user request for information on the best/worst days in an upcoming time period to buy a vehicle of the specified configuration (step 210), vehicle data system 120 may operate to determine anticipated daily discounts that are applicable to particular vehicle (step 220). From the computed daily discounts, vehicle data system 120 may operate to determine the best day and/or the worst day to buy the particular vehicle (step 230) and report same to the user (step 240). Method 200, particularly step 220, will be further described below with reference to FIG. 3.

In one embodiment, vehicle data system 120 may receive the user request over a network. In one embodiment, the network can include the World Wide Web (Web). As an example, vehicle data system 120 may generate a report containing the best day and/or the worst day to buy the particular vehicle and deliver same over the network to a computing device associated with the user. In one embodiment, such a report may be assembled at the computing device associated with the user, using information provided by vehicle data system 120. In one embodiment, the report can be displayed to the user via a Web browser application running on the computing device associated with the user.

In some embodiments, the report may be prepared by software running on one or more server machines. In some embodiments, the software may be included in a computer program product comprising at least one non-transitory computer readable medium storing instructions translatable by the one or more server machines. In some embodiments, the computer program product can be part of a vehicle data system. In some embodiments, the vehicle data system may comprise a Web based user interface through which the report is displayable.

Figure 3:
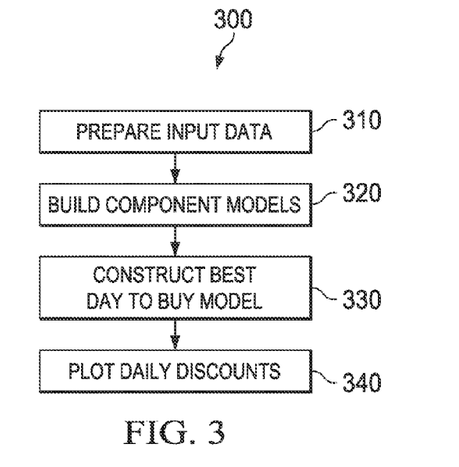
FIG. 3 depicts a flow diagram illustrating an example method of generating a best/worst time to buy report.

FIG. 3 depicts a flow diagram illustrating an example method of generating a best/worst time to buy report. In one embodiment, method 300 may comprise preparing input data (step 310). In one embodiment, step 310 may comprise obtaining certain inputs from a plurality of sources. In some embodiments, some or all of the plurality of sources may reside external to the above-mentioned one or more server machines. In one embodiment, step 310 may comprise generating certain input data at the one or more server machines.

In one embodiment, method 300 may further comprise building models for each of a plurality of components (step 320). In one embodiment, method 300 may further comprise constructing a main model using outputs from the component models. This main model, which, for the purpose of illustration, is also referred to herein as the Best Day to Buy Model and which is further described, below, can predict a percentage of discount on a particular commodity for each given day in a projected time period. In one embodiment, results (daily discounts on the commodity of interest) from the Best Day to Buy Model are then plotted, for display to the requesting user (step 340).

As an example, to construct the Best Day to Buy Model, vehicle data system 120 may obtain input data from a variety of sources. Examples of such sources may include external sources 184 and inventory company 140, OEM 150, sales data company 160, etc. Example types of input data obtained by vehicle data system 120 may include historical data on incentives, dealer costs, transaction prices, inventory levels, sales volumes, manufacturer suggested retail prices (MSRP), marketing promotion dollars, etc. Transaction price and cost information may be used to generate profit margins historically. More specifically, in some embodiments, profit margins may be relative to price over cost. In some embodiments, profit margins may be relative to price over MSRP.

Additionally, vehicle data system 120 may generate new input data for use by the Best Day to Buy model. Vehicle data system 120 may generate new input data using the input data obtained from a variety of sources. The new input data generated by vehicle data system 120 may be predictive in nature. Examples of input data generated by vehicle data system 120 may include predicted customer incentives, predicted dealer incentives, etc. In some embodiments, these incentives may be independently determined using an incentives forecasting model and fed into the Best Day to Buy Model as inputs. This incentives forecasting model may be considered a component model. In some embodiments, the incentives forecasting model may be built into the model formulation for the Best Day to Buy Model.

Quantities of similar vehicles in stock relative to projected sales volumes (based on historical data) can give a reflection of the willingness a dealership might have in letting go of vehicles at historically low prices (or vice-versa). Thus, in some embodiments, vehicle data system 120 may determine an amount of daily supply of a vehicle configuration based on inventor levels and sales volumes where Days Supply=Inventory Levels/Sales Volumes.

The input data may be obtained and/or generated at the industry level, at the manufacturer level, at the make level, or a subset thereof. Vehicle data system 120 may determine an anticipated daily discount utilizing the obtained/generated input data specific to a vehicle configuration.

Example embodiments of the Best Day to Buy Model will now be described in details below. Note that for each of these example embodiments, the models can be applied at any level of granularity required. For instance, the practitioner might choose to apply at the make level (building a separate model for each make of vehicle), the model level, or the industry level. Similarly, geographic segmentations can be performed as well. Thus, in practice, each example embodiment may be implemented in various ways.

Best Day to Buy Model Embodiment #1:

In this embodiment, daily price discounts from prior years may be used as the baseline estimate to determine discounts for the current year. Specifically, to identify the best day to buy, a set of characteristics of date including month, day of week, and day of month is gathered. These characteristics can be put into a regression formulation to derive a projected discount for a given day.

Best Day to Buy Model:
Y(day)=Anticipated Discount By Day $$Y(\text{day}) = \beta_0 + \sum_{i=1}^{3} \beta_i Z_i(\text{day})$$

where
$Z_1$=indicator variable of month,
$Z_2$=indicator variable of day of week,
$Z_3$=indicator variable of day of month.

Note that each indicator variable $Z_1$ is a representation of a set of variables. For example, $Z_2$ represents a set of 6 variables, each of which represents a single day of a week (as always one choice must be left out as it is fully determined by selecting 0s for all other choices). Also, each coefficient $\beta_i$ for each indicator variable is a representation of a set of coefficients. For example, $\beta_2$ represents a set of 6 coefficients, each of which is associated with a day of week. However, for any given day, only one of the variables and coefficients apply.

Intuitively, the model says that, for a given date, the anticipated discount will be determined based on the historical discounts from the same day in previous years as well as on which day of the week the given date falls. It is likely that discounts given on weekdays are different than discounts given on weekends.

The model can be written in another way: Y(day)=a0+a1*(month)+a2*(day of week)+a3*(day in month).

This model can be built as a linear regression or could be constructed by the practitioner with a time series methodology. Suitable methodologies may include an autoregressive integrated moving average (ARIMA), autoregressive conditional heteroskedasticity (ARCH), heterogeneous ARCH (MARCH), generalized ARCH (GARCH), etc. ARIMA, ARCH, MARCH, GARCH, and other suitable regression models are known to those skilled in the art and thus are not further described herein.

Example of Best Day to Buy Model Embodiment #1:

The Best Day to Buy Model embodiment described above can be expressed as follows:

$$Y(\text{Date}) = \beta_0 + \sum_{i=1}^{3} \beta_i Z_i(\text{day}) = \beta_0 + (\beta_1 Jan + \beta_2 Feb + \beta_3 Mar + \beta_4 Apr + \beta_5 May + \beta_6 Jun + \beta_7 Jul + \beta_8 Aug + \beta_9 Sep + \beta_{10} Oct + \beta_{11} Nov) + (\beta_{14} Mon + \beta_{15} Tue + \beta_{16} Wed + \beta_{17} Thu + \beta_{18} Fri + \beta_{19} Sat) + \sum_{i=20}^{50} \beta_i Day_i$$

Suppose on May 14, 2011, vehicle data system 120 receives a user request for information on which of the following 31 days might be the best day to buy a commodity. Vehicle data system 120 or a computer program product associated therewith may operate to derive a projected daily discount relative to a set price for the commodity for each of the following 31 days (May 15, 2011-Jun. 14, 2011).

As a specific example, for the Date May 28, 2011, all the month flags [Jan, Apr]=0 and [Jun, Nov]=0, and May=1 since the date occurs in the month of May. Similarly, since the date falls on a Saturday, the day of week flags [Mon-Fri]=0, while Sat=1. Last, since the day of the date=28, then all but the Day=28 day flags=0 and Day 28=1.

Hence, the equation reduces to:

$Y(05/28/2011) = \beta_0 + \beta_5 May + \beta_{19} Sat + \beta_{47} Day28$

From a regression procedure, the following coefficients can be obtained:

| | |
|---|---|
| $\beta_0$ | 0.061 |
| $\beta_5$ | 0.001 |
| $\beta_{19}$ | 0.0092 |
| $\beta_{47}$ | 0.01 |

Figure 4:
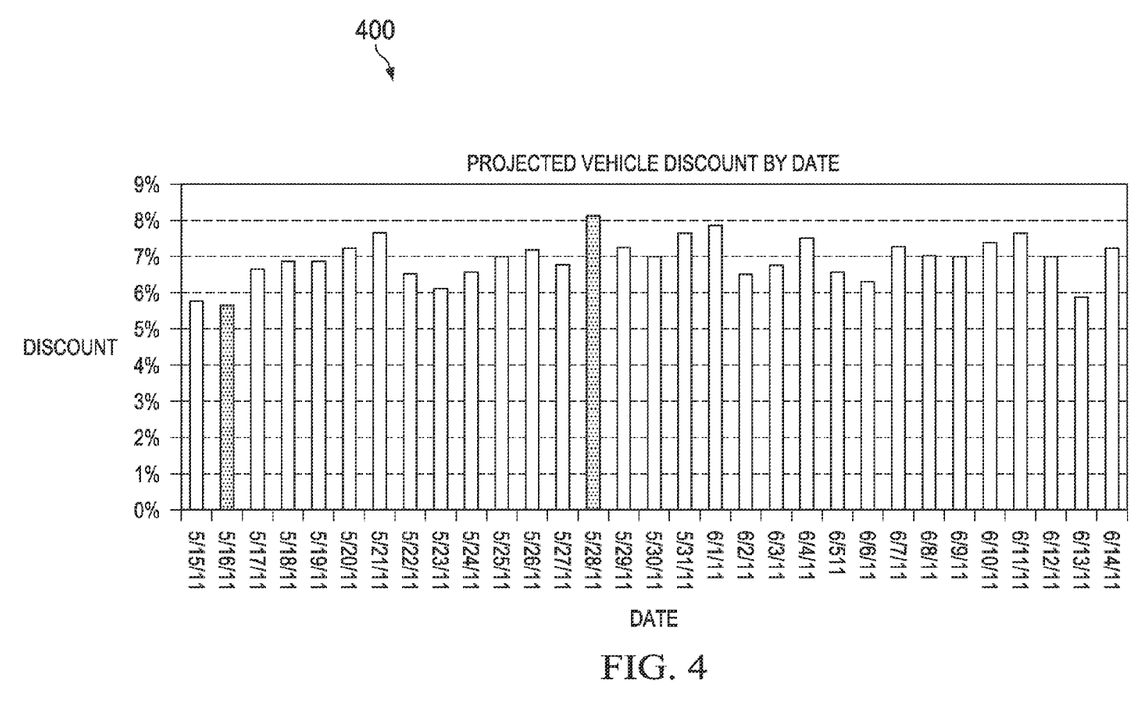
FIG. 4 depicts a plot diagram showing projected daily discounts of sales of a vehicle, according to one embodiment disclosed herein.

Plugging in the coefficients, the discount for this date $Y(05/28/2011) = 0.061 + 0.001*1 + 0.0092*1 + 0.01*1 = 0.812 = 8.12\%$, This derivation process is performed for each of the 31 days following May 14, 2011. Table 1 below shows example projected daily discounts for the specified time period. Outputs from the Best Day to Buy Model can then be plotted or otherwise used to identify the best and/or the worst day to buy. FIG. 4 depicts sample plot 400 for mid-May to mid-June, showing the best day to buy to be May 28, 2011 and the worst day to buy to be May 16, 2011.

TABLE 1

| Date | Projected Average Discount |
|---|---|
| May 15, 2011 | 5.74% |
| May 16, 2011 | 5.67% |
| May 17, 2011 | 6.68% |
| May 18, 2011 | 6.89% |
| May 19, 2011 | 6.90% |
| May 20, 2011 | 7.25% |
| May 21, 2011 | 7.67% |

TABLE 1-continued

| Date | Projected Average Discount |
|---|---|
| May 22, 2011 | 6.55% |
| May 23, 2011 | 6.13% |
| May 24, 2011 | 6.60% |
| May 25, 2011 | 7.04% |
| May 26, 2011 | 7.20% |
| May 27, 2011 | 6.78% |
| May 28, 2011 | 8.12% |
| May 29, 2011 | 7.27% |
| May 30, 2011 | 7.01% |
| May 31, 2011 | 7.68% |
| Jun. 1, 2011 | 7.91% |
| Jun. 2, 2011 | 6.54% |
| Jun. 3, 2011 | 6.78% |
| Jun. 4, 2011 | 7.54% |
| Jun. 5, 2011 | 6.58% |
| Jun. 6, 2011 | 6.33% |
| Jun. 7, 2011 | 7.31% |
| Jun. 8, 2011 | 7.05% |
| Jun. 9, 2011 | 6.94% |
| Jun. 10, 2011 | 7.43% |
| Jun. 11, 2011 | 7.67% |
| Jun. 12, 2011 | 6.97% |
| Jun. 13, 2011 | 5.86% |
| Jun. 14, 2011 | 7.28% |

Best Day to Buy Model Embodiment #2:

In this embodiment, "seasonal" discounts are combined with other important factors as inputs to the Best Day to Buy Model. This Best Day to Buy Model Embodiment #2 can be considered to be more complex than the Best Day to Buy Model Embodiment #1 as there are additional variables. Also, values of corresponding coefficients ($\beta$) may be different.

To identify the best day to buy, a set of inputs is gathered and put into a regression formulation to derive a projected discount for a given day. The daily discounts over a time period can be determined from the day-specific discount thus projected. As a specific example, given a particular date, the daily discounts may be computed for the next 30 days following the particular date. However, the same approach can be easily extended to n days provided the practitioner has sufficient historical data to do so.

Best Day to Buy Model:
Y(day)=Anticipated Discount By Day $$Y(\text{day}) = \beta_0 + \sum_{i=1}^{11} \beta_i Z_i(\text{day})$$

where
$Z_1$=indicator variable of month,
$Z_2$=indicator variable of day of week,
$Z_3$=indicator variable of day of month,
$Z_4$=recent average discount (most recent weeks actual data in sample)
$Z_5$=discount on the same day of the prior year,
$Z_6$=marketing promotion dollars now vs one year ago,
$Z_7$=predicted delta customer incentives relative to recent average (past weeks actual data),
$Z_8$=predicted delta dealer incentives relative to recent avg (past wks actual data),
$Z_9$=average days supply (inventory/sales),
$Z_{10}$=indicator variable for major holiday,
$Z_{11}$=indicator variable for minor holiday.

The indicator variables can be separate indicator flags for each specific holiday. Due to sample size issues, in this embodiment, holidays are grouped together into two clusters.

As an example, grouping may be determined based on the average discounts per each holiday over the last three years. Those holidays with the greatest discounts may be clustered together into the designation major holiday, as historically they tend to be major holidays. As those skilled in the art can appreciate, although the nomenclature may differ, this grouping process identifies high discount holidays (major) and low discount holidays (minor). Those with the most discounts are classified as major holidays and those with the least discounts are classified as minor holidays. One approach is to first identify the official holidays and the subsequent weekends connected to them in those cases where the holiday is on a Monday or a Friday. Then, the historical average discount may be computed for the holiday (including all days associated with that holiday). Next, the relative discount of those holidays may be identified relative to the month's average discount.

As a specific example, the ten official holidays in the U.S. may have the following discount rates associated therewith:
New Year's=8.2% (+3.0%)
MlX Day=4.3% (−0.3%)
President's Day=4.3% (−0.1%)
Memorial Day=6.5% (+1.5%)
Independence Day=5.2% (+0.4%)
Labor Day=6.2% (+1.3%)
Columbus Day=4.9% (+0.7%)
Veteran's Day=4.3°6 (−0.5%)
Thanksgiving=5.3% (+2.4%)
Christmas=7.8% (+2.1%)

In this example, the discount on Labor Day (and days associated via weekend, where applicable, with Labor Day) might be 6.2%, which is 1.3% greater than the average September discount. Finally, these ten holidays are grouped into two approximately uniform classifications in which Memorial, Labor, Thanksgiving, Christmas, and New Year's days would be considered major holidays. The other five holidays would be considered as minor holidays.

The above formulation may be written another way: Y(day)=a0+a1*(month)+a2*(day of week)+a3*(day in month)+a4*(recent average discount)+a5*(discount on same day prior year)+a6*(marketing promotion dollars now vs one year ago)+a7*(predicted delta dealer incentives relative to recent average)+a8*(predicted delta consumer incentives relative to recent average)+a9*(average days supply)+a10*I (major holiday)+a11*(minor holiday).

Although only 11 variables are applied in this embodiment, more factors can be easily incorporated into this framework. For example, macro economic factors and local demographic information may both help improve the best-day-to-buy estimations.

Example of Best Day to Buy Model Embodiment #2:

Table 2 below illustrates by example various variables and different values of coefficients fed into the above formulation to derive an anticipated discount for May 28, 2011.

TABLE 2

| | Value | $\beta$ | $\beta Z$ |
|---|---|---|---|
| $\beta_1$ | | 0.032 = | 0.032 |
| May | 1 × | 0.002 = | 0.002 |
| Sat | 1 × | 0.082 = | 0.082 |
| 28 | 1 × | 0.007 = | 0.007 |
| $Z_4$ | 0.068 × | 0.1 = | 0.0068 |
| $Z_5$ | 0.071 × | 0.23 = | 0.01633 |
| $Z_6$ | 1.12 × | −0.06 = | −0.0672 |
| $Z_7$ | 143 × | 8.1E−06 = | 0.001158 |
| $Z_8$ | 10 × | 0.00002 = | 0.0002 |

TABLE 2-continued

| | Value | β | βZ |
|---|---|---|---|
| $Z_9$ | 30.8 × | 4.32E–05 = | 0.001331 |
| $Z_{10}$ | 0 × | 0.002 = | 0 |
| $Z_{11}$ | 0 × | 0.005 = | 0 |
| Total | | | 8.16% |

It can be seen that with Embodiment #2, the projected discount (8.16%) on May 28, 2011 is similar though not exactly the same as the projected discount (8.12%) on May 28, 2011 from Embodiment #1.

Note that the above model can be constructed using typical ordinary least squares (OLS) regression procedures. OLS and other linear regression models are known to those skilled in the art and thus are not further described herein. Two of the inputs ($Z_7$ and $Z_8$) to this model are actually model results. These two models thus must first be constructed:

$Z_7 = E$[customer incentives@day]–average recent cust incentives(past 4 wks), where $E$[customer incentives@day] = current customer incentives + $I$(if day equals next incentives month) ∗

$P$(customer incentives change next month) ∗

$E$[customer incentives change next month | incentives change]

Within this formulation are embedded two additional models, as detailed below:

$P$(customer incentives change next month) the probability that incentives will change during next incentives period (the incentives period covering the particular day of interest); and $E$[customer incentives change next month|incentives change] or the expected value of the incentives change given that there is an incentives change in the upcoming period.

Taking as inputs the time series of sales, inventory, time series of days supply, months until release of next year's new model, each incentive model will now be described more explicitly.

As an example of the form of these incentive models, one embodiment would be $P$(Δ customer incentives next incentives period for given car model) =

$$\frac{1}{1 + e^{-(a_0 + \Sigma a_k x_k)}}$$

where $X_1 = \frac{S - S_{ma3}}{S_{ma3}}$, with S=sales, $S_{ma3}$=3 months moving average of sales, $X_2 = \frac{S - S_{ma12}}{S_{ma12}}$, with $S_{ma12}$=12 months moving average of sales, $X_3 = \frac{S - S_{12}}{S_{12}}$, with $S_{12}$=sales from 1 year ago $X_4 = \frac{D - D_{ma3}}{D_{ma3}}$, with=days supply (inventory sales), $D_{ma3}$=3 months average of days supply, $X_5 = \frac{D - D_{ma12}}{D_{ma12}}$, with $D_{ma12}$=12 months moving average of days supply, $X_6 = \frac{D - D_{12}}{D_{12}}$, with $D_{12}$=days supply from 1 year ago
$X_7$=indicator for whether a new release of this model is scheduled within 3 months,
$X_8$=indicator for whether a new release of this model is scheduled within 1 month,
$X_9$=indicator for whether a new release of this model occurred within 1 month ago,
$X_{10}$=indicator for whether a new release of this model occurred within 3 months ago.

In some embodiments, the expected value of that incentive may be similarly computed in the form of a linear model.

$E$[customer incentives change next month|incentives change) or the expected value of the incentives change given that there is an incentives change in the upcoming period.

Set population to be only those sales for which an incentives change (relative to the previous period) occurred, then proceed. As an example of the form of these incentive models, one embodiment would be $E[\Delta\text{cust incentive}|\Delta] = \beta_0 + \Sigma_{i=1}^{10} \beta_i X_i$, where $X_1 = \frac{S - S_{ma3}}{S_{ma3}}$, with S=sales, $S_{ma3}$=3 months moving average of sales, $X_2 = \frac{S - S_{ma12}}{S_{ma12}}$, with $S_{ma12}$=12 months moving average of sales, $X_3 = \frac{S - S_{12}}{S_{12}}$, with $S_{12}$=sales from 1 year ago $$X_4 = \frac{D - D_{ma3}}{D_{ma3}},$$

with D=days supply (inventory/sales),
$D_{ma3}$=3 months average of days supply, $$X_5 = \frac{D - D_{ma12}}{D_{ma12}},$$

with $D_{ma12}$=12 month moving average of days supply, $$X_6 = \frac{D - D_{12}}{D_{12}},$$

with $D_{12}$=days supply from 1 year ago,
$X_7$=indicator or whether a new release of this model is scheduled within 3 months,
$X_8$=indicator or whether a new release of this model is scheduled within 1 month,
$X_9$=indicator for whether a new release of this model occurred within 1 month ago,
$X_{10}$=indicator for whether a new release of this model occurred within 3 months ago.

Next, compute the recent discount for a recent time period and calculate the average consumer and dealer incentives over that time period. Take the expected consumer and dealer incentives changes month over month to determine the expected incentives amounts. Then, perform subtraction to produce the delta incentives values relative to the "recent time period."

The above enables the construction of a total statistical model result to use as an input:

$Z_7 = E$[customer incentives@day]−average recent cust incentives(past 4 wks), where $E$[customer incentives@day] = current customer incentives + $I$(if day equals next incentives month) ∗

$P$(customer incentives change next month) ∗

$E$[costomer incentives change next month | incentives change]

The same approach may be used to determine dealer incentives:

$Z_8 = E$[dealer incentives@day]−average recent dealer incentives(past 4 wks), where $E$[dealer incentives@day] = current dealer incentives + $I$(if day equals next incentives month) ∗

$P$(dealer incentives change next month) ∗

$E$[dealer incentives change next month | incentives change]

Within this are embedded two additional models, as detailed below:

$P$(dealer incentives change next month) or the probability that incentives will change during next incentives period; and $E$[dealer incentives change next month|incentives change] or the expected value of the incentives change given that there is an incentives change in the upcoming period.

Taking as inputs the time series of sales, inventory, time series of days supply, months until release of next year's new model, each incentive model will now be described more explicitly.

As an example of the form of these models, one embodiment would be the construction of the logistic regression:

$P(\Delta$ dealer incentives next incentives period for given car model) =

$$\frac{1}{1 + e^{-(a_0 + \Sigma a_k x_k)}}$$

where $$X_1 = \frac{S - S_{ma3}}{S_{ma3}},$$

with S=sales, $S_{ma3}$=3 months moving average of sales, $$X_2 = \frac{S - S_{ma12}}{S_{ma12}},$$

with $S_{ma32}$=12 months moving average of sales, $$X_3 = \frac{S - S_{12}}{S_{12}},$$

with $S_{12}$=sates from 1 year ago, $$X_4 = \frac{D - D_{ma3}}{D_{ma3}},$$

with D=days supply (inventory/sales),
$D_{ma3}$=3 month average of days supply, $$X_5 = \frac{D - D_{ma12}}{D_{ma12}},$$

with $D_{ma12}$=12 months moving average of days supply, $$X_6 = \frac{D - D_{12}}{D_{12}},$$

with $D_{12}$=days supply from 1 year ago,
$X_7$=indicator for whether a new release of this model is scheduled within 3 months,
$X_8$=indicator for whether a new release of this model is scheduled within 1 month,
$X_9$=indicator for whether a new release of this model occurred within 1 month, ago,
$X_{10}$=indicator for whether a new release of this model occurred with, in 3 months ago.

The expected value of that incentive may be similarly computed in the form of a linear model.

E[dealer incentives change next month|incentives change) or the expected value of the incentives change given that there is an incentives change in the upcoming period.

Set population to be only those for which an incentives change occurred, then proceed. As an example of the form of these models, one embodiment would be the linear regression:

$$E[\Delta \text{dealer incentive}|\Delta] = \beta_0 + \Sigma_{i=1}^{10} \beta_i X_i,$$

where $$X_1 = \frac{S - S_{ma3}}{S_{ma3}},$$

with S=sales, $S_{ma3}$=3 months moving average of sales, $$X_2 = \frac{S - S_{ma12}}{S_{ma12}},$$

with $S_{ma12}$=12 months moving average of sales, $$X_3 = \frac{S - S_{12}}{S_{12}},$$

with $S_{12}$=sales from 1 year ago, $$X_4 = \frac{D - D_{ma3}}{D_{ma3}},$$

with=days supply (inventory/sales),
$D_{ma3}$=3 months average of days supply, $$X_5 = \frac{D - D_{ma12}}{D_{ma12}},$$

with $D_{ma12}$=12 months moving average of days supply, $$X_6 = \frac{D - D_{12}}{D_{12}},$$

with $D_{12}$=days supply from 1 year ago,
$X_7$=indicator for whether a new release of this model is scheduled within 3 months,
$X_8$=indicator for whether a new release of this model is scheduled within 1 month,
$X_9$=indicator for whether a new release of this model occurred within 1 month ago,
$X_{10}$=indicator for whether anew release of this model occurred within 3 months ago.

Finally, as stated earlier, a total statistical model result can be constructed to use as an input:

$$Z_8 = E[\text{dealer incentives@day}] - \text{average recent dealer incentives(past 4 wks)},$$

where $$E[\text{dealer incentives@day}] = \text{current dealer incentives} + 1$$
$$\text{(if day equals next incentives month)}^*P(\text{dealer incentives change next month})^*E[\text{dealer incentives change next month}|\text{incentives change}]$$

Note that if one so chooses, a similar approach may be taken to account for incentive changes on holidays as well.

Thus, building models for each of a plurality of components and feeding outputs from those models into a main model, a Best Day to Buy Model may be constructed to predict a percentage of discount on a particular commodity for each given day in a projected time period as shown in the above model formulation and restated below:

$$Y(\text{day}) = a0 + a1^*(\text{month}) + a2^*(\text{day or week}) + a3^*(\text{day in month}) + a4^*(\text{recent discount weighted by recency}) + a5^*(\text{discount on same day prior year}) + a6^*(\text{marketing promotion dollars}) + a7^*(\text{predicted delta dealer incentives relative to moving average}) + a8^*(\text{predicted delta consumer incentives relative to moving average}) + a9^*(\text{days supply}) + a10^*I(\text{major holiday}) + a11^*I(\text{minor holiday}).$$

Figure 5:
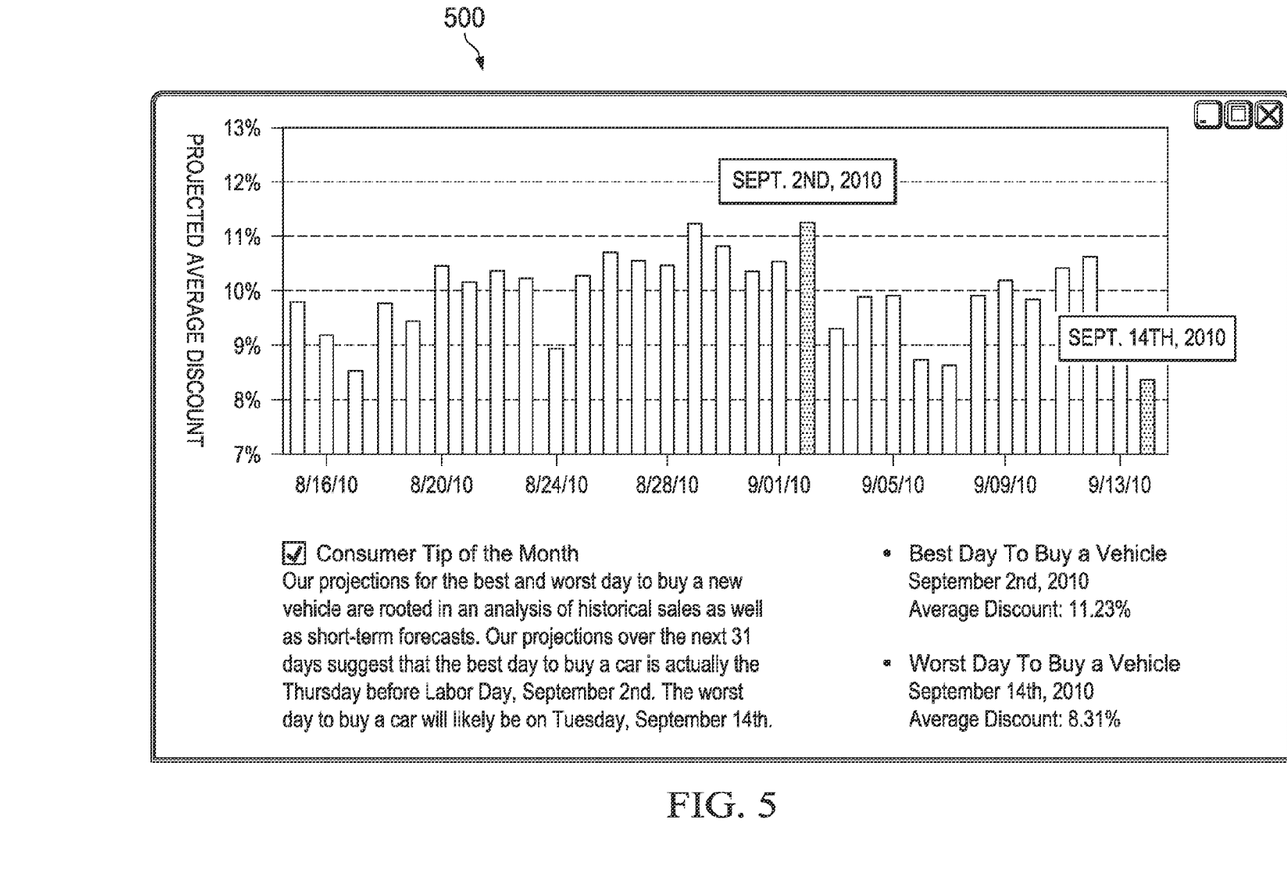
FIG. 5 depicts an example report for best day to buy a vehicle, according to one embodiment disclosed herein.

From this, the daily discounts can be plotted and displayed to an end user as illustrated in FIG. 5. FIG. 5 depicts example report 500 containing a bar chart that shows, on a projected average, an aggregated amount of daily discounts over a period of a month.

Although the invention has been described with respect to specific embodiments thereof, these embodiments are merely illustrative, and not, restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material, to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention, to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall, generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

Furthermore, the term or as used herein is generally intended to mean "and/or" unless otherwise indicated. As used herein, including the claims that follow, a term preceded by "a" or an (and the when antecedent basis is or "an") includes both singular and plural of such term, unless clearly indicated within the claim otherwise (i.e., that the reference "a" or "an" clearly indicates only the singular or only the plural). Also, as used in the description, herein and throughout the claims that follow, the meaning of in includes in and on unless the context clearly dictates otherwise. The scope of the present disclosure should be determined by the following claims and their legal equivalents.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A method for predicting best/worst time to buy a commodity, comprising:
   determining which month, day of week, and day of month a first day falls on a given year;
   for each of a number of days following the first day in the given year, deriving a projected daily discount relative to a set price for the commodity, wherein software running on one or more server computers performs the deriving utilizing historical discounts associated with the month, the day of week, and the day of month in years prior to the given year;
   identifying a second day from the number of days to be best day to buy the commodity, wherein the second day is associated with a maximum projected daily discount; and
   communicating the best day to buy the commodity to a user over a network.

2. The method of claim 1, wherein the deriving comprises feeding the set of characteristics into a predictive model.

3. The method of claim 2, wherein the predictive model comprises a regression formulation $Y(Day)=\beta_0+\Sigma_{i=1}^{3}\beta_i Z_i(Day)$ where Day represents a day in the number of days, $Z_1$ represents a first set of variables for the month, $Z_2$ represents a second set of variables for the day of week, and $Z_3$ represents a third set of variables for the day of month, and wherein each coefficient $\beta_i$ represents a set of coefficients, each of which is associated with a corresponding variable from the first, second, or third set of variables.

4. The method of claim 2, wherein the predictive model comprises a regression formulation having a plurality of indicator variables, a first of which represents a first set of variables for the month, a second of which represents a second set of variables for the day of week, a third of which represents a third set of variables for the day of month, a fourth of which represents a major holiday, and a fifth of which represents a minor holiday.

5. The method of claim 4, wherein the regression formulation for the predictive model further comprises an input variable representing a discount on same day of last year.

6. The method of claim 4, wherein the regression formulation for the predictive model further comprises at least two input variables representing different incentives.

7. The method of claim 6, further comprising:
   determining an expected value for each of the different incentives, wherein the software running on the one or more server computers performs the determining utilizing an incentive model.

8. The method of claim 1, further comprising:
   on the first day, receiving from a computing device associated with the user a request for information on the best/worst time to buy the commodity, wherein the request specifies the number of days.

9. The system of claim 1, wherein the instructions are further translatable by the at least one processor to construct a predictive model, the predictive model comprising a regression formulation $Y(Day)=\beta_0+\Sigma_{i=1}^{3}\beta_i Z_i(Day)$ where Day represents a day in the number of days, $Z_1$ represents a first set of variables for the month, $Z_2$ represents a second set of variables for the day of week, and $Z_3$ represents a third set of variables for the day of month, and wherein each coefficient $\beta_i$ represents a set of coefficients, each of which is associated with a corresponding variable from the first, second, or third set of variables.

10. The system of claim 1, wherein the instructions are further translatable by the at least one processor to construct a predictive model, the predictive model comprising a regression formulation having a plurality of indicator variables, a first of which represents a first set of variables for the month, a second of which represents a second set of variables for the day of week, a third of which represents a third set of variables for the day of month, a fourth of which represents a major holiday, and a fifth of which represents a minor holiday.

11. The system of claim 1, wherein the instructions are further translatable by the at least one processor to perform:
   determining an expected value for each of a plurality of incentives; and
   providing the expected value as input to the predictive model.

12. A computer program product comprising at least one non-transitory computer readable medium storing instructions translatable by one or more machines to perform:
   determining which month, day of week, and day of month a first day falls on a given year;
   for each of a number of days following the first day in the given year, deriving a projected daily discount relative to a set price for the commodity, utilizing historical discounts associated with the month, the day of week, and the day of month in years prior to the given year;
   identifying a second day from the number of days to be best day to buy the commodity, wherein the second day is associated with a maximum projected daily discount; and
   communicating the best day to buy the commodity to a user over a network.

13. The computer program product of claim 12, wherein the instructions are further translatable by the one or more machines to construct a predictive model, the predictive model comprising a regression formulation $Y(Day)=\beta_0+\Sigma_{i=1}^{3}\beta_i Z_i(Day)$ where Day represents a day in the number of days, $Z_1$ represents a first set of variables for the month, $Z_2$ represents a second set of variables for the day of week, and $Z_3$ represents a third set of variables for the day of month, and wherein each coefficient $\beta_i$ represents a set of coefficients, each of which is associated with a corresponding variable from the first, second, or third set of variables.

14. The computer program product of claim 12, wherein the instructions are further translatable by the one or more machines to construct a predictive model, the predictive model comprising a regression formulation having a plurality of indicator variables, a first of which represents a first set of variables for the month, a second of which represents a second set of variables for the day of week, a third of which represents a third set of variables for the day of month, a fourth of which represents a major holiday, and a fifth of which represents a minor holiday.

15. The computer program product of claim 14, wherein the instructions are further translatable by the one or more machines to perform:
   determining an expected value for each of a plurality of incentives; and
   providing the expected value as input to the predictive model.

16. The computer program product of claim 14, wherein the instructions are further translatable by the one or more machines to perform:
   on the first day, receiving from a computing device associated with the user a request for information on the best/worst time to buy the commodity, wherein the request specifies the number of days.

17. The computer program product of claim 16, wherein the instructions are further translatable by the one or more machines to perform:
   generating a Best Day to Buy report containing information on the best day to buy the commodity; and delivering the Best Day to Buy report over the network to the computing device associated with the user.

18. The computer program product of claim 16, wherein the instructions are further translatable by the one or more machines to perform:

obtaining at least a portion of the set of characteristics from a plurality of sources.

19. The computer program product of claim 16, wherein the instructions are further translatable by the one or more machines to perform:

generating at least a portion of the set of characteristics.

20. A system for predicting best/worst time to buy a commodity, comprising:

at least one processor;

at least one non-transitory computer readable medium storing instructions translatable by the at least one processor to perform:

determining which month, day of week, and day of month a first day falls on a given year;

for each of a number of days following the first day in the given year, deriving a projected daily discount relative to a set price for the commodity, wherein software running on one or more server computers performs the deriving utilizing historical discounts associated with the month, the day of week, and the day of month in years prior to the given year;

identifying a second day from the number of days to be best day to buy the commodity, wherein the second day is associated with a maximum projected daily discount; and communicating the best day to buy the commodity to a user over a network.

\* \* \* \* \*